UNITED STATES PATENT OFFICE.

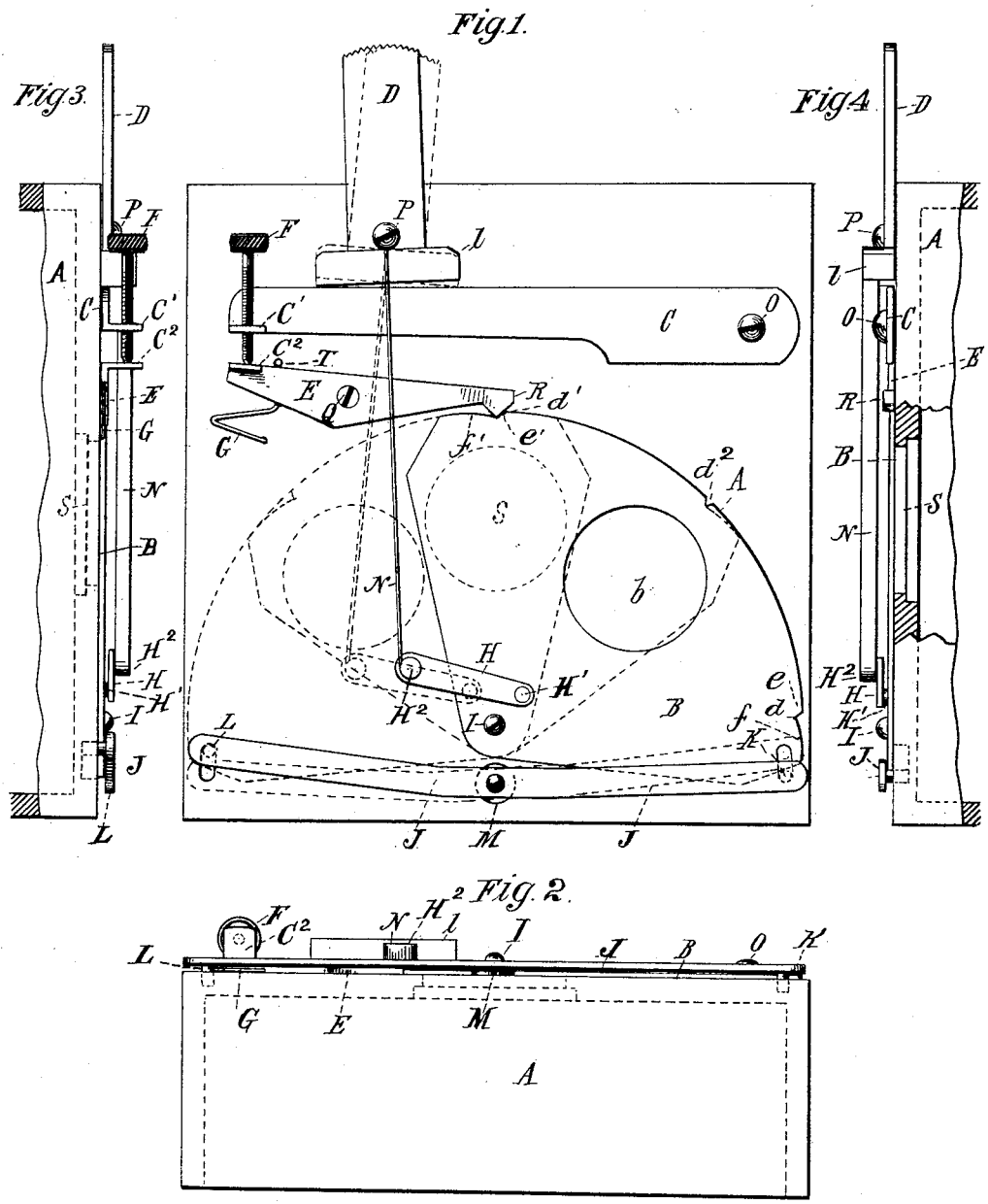

ABNER G. TISDELL, OF BROOKLYN, NEW YORK.

PHOTOGRAPHIC-CAMERA SHUTTER.

SPECIFICATION forming part of Letters Patent No. 464,260, dated December 1, 1891.

Application filed October 30, 1890. Serial No. 369,865. (No model.)

*To all whom it may concern:*

Be it known that I, ABNER G. TISDELL, a citizen of the United States, residing in the city of Brooklyn, county of Kings, and State of New York, have made a new and useful Improvement in Photographic-Camera Shutters, of which the following is a specification, and which, when taken in connection with the accompanying drawings, will enable others skilled in the art to make and use my invention.

My invention relates, principally, to the fronts of cameras used for making instantaneous exposures, and it is especially adapted for cameras of the type known as "detective-cameras," though the same may be used in cameras of other kinds.

My invention consists in an improved mechanism for operating the shutter or device which opens and closes the lens-opening for the purpose of exposing the plate when it is desired to take a view.

Many forms of shutter-operating mechanism exist, and in the majority of such devices as used upon detective-cameras the operator first sets the shutter—that is, he moves the shutter from one side to the other—and in so doing compresses a spring or other force-giving medium, the force of which is subsequently expended in moving the shutter from side to side or past the lens-opening when it is desired to take a picture. After an exposure has been made another one cannot be made until the shutter has been reset. Thus the shutter has to be moved from one side to the other after each exposure and before another exposure can be made. In my present invention this is obviated, and I make an exposure by moving the shutter with like rapidity from one side or the other, it not being material whether the shutter moves from left to right or right to left to make the exposure. My shutter is thus always set for operation, whether the same is on one side or the other side of the camera.

My invention also relates to mechanism for controlling the speed of the movement of the shutter from side to side and mechanism to receive and absorb the impact of the shutter, thus preventing any rebound when the shutter is stopped after moving rapidly across the opening in the box occupied by the lens. This latter portion of my invention can be used with shutters of any kind that move rapidly and have a tendency to fly back, and I do not, so far as this portion of the invention goes, limit myself to a shutter having the peculiarities of construction or operation which the shutter here shown has, although with the mechanism shown the means of arresting the shutter is of great utility and importance.

Referring to the accompanying drawings, Figure 1 shows a plan view of the shutter mechanism. Fig. 2 shows a front elevation of Fig. 1 from below. Fig. 3 shows a side elevation from the left-hand side of Fig. 1, and Fig. 4 shows the same from the right hand.

The camera body or front, consisting of four sides and a front board, is shown at A.

The lens is fixed in the opening S, as in any ordinary camera, and such parts need no special description.

The shutter B is shown in full lines, as at the right-hand side of the box, the said shutter being pivoted on a pivot I. The shutter is shown in three positions. The extreme right-hand position is indicated by full lines, the central position, when the opening $b$ of the shutter is opposite the opening S in the camera, and the extreme left-hand position of the shutter, where the opening $b$ is shown by dotted lines, being as much to the left of the lens-opening S as it is to the right of the same opening when the shutter is moved to the extreme right-hand position. Of course it will be understood that the shutter is so arranged that in traveling from the extreme right-hand position to the extreme left-hand position or the reverse the opening $b$ comes directly opposite the lens-opening S. The shutter is notched, as shown at $d$, $d'$, and $d^2$. $d$ and $d'$ are the main or principal notches, $d^2$ being merely used when it is desired to set the shutter by hand in a central position and leave the lens open. The link H is pivoted at one end and the pin H' secured to the shutter just above the pivot I, on which the shutter turns. This link at the other end has a pin $H^2$, which is connected with a flat spring N, which at its upper end is rigidly fixed to the thumb-piece D, which is pivoted at P. It is now evident, supposing the rest of the mechanism to be removed, that by taking hold of the roughened upper end of the piece D the same can be vibrated on its center P, and that by moving it from right to left with the finger the shutter can be caused to move from left to right, the flat spring N and the link H together pulling it from side to side. When the piece D is vibrated to the left, the shutter will move to the right, and vice versa. In this condition exposures can be made by moving the shutter either from the left-hand position to the right-hand position or back again from the right-hand position to the left-hand position; but a shutter so operated would be too much under the control of the operator's fingers, and there would be no certainty as to the speed at which the shutter would be moved across the lens-opening. Likewise its movements would be slow.

To make the periods of exposure, which are governed by the rapidity of the movement of the shutter, uniform, and to gain the necessary speed, I use the following mechanism: C is a pivoted tripping-lever pivoted at O and lying under the tripping cross-piece $l$, which forms a rigid portion of the operating thumb-piece D. This tripping-lever C has at its end, as clearly shown, a thumb-screw F, which passes through a threaded hole formed in an ear C', bent at right angles (or toward the observer) from the lever C at its end, as clearly seen in Fig. 3. This screw is threaded in the ear. Its lower end is to bear upon another like ear C², bent outward from the detent E, which detent is pivoted at Q, and has a spring G located under it, so that at all times the tooth R may be pressed downward, so that it may engage with any one of the notches $d$, $d'$, and $d^2$. Each notch has one vertical or substantially vertical wall, as shown in the drawings, the notch $d$ having its vertical wall $e$ arranged to resist the movement of the shutter from left to right, while the notch $d'$ has its vertical wall $e$ so arranged as to resist the movement of the shutter from right to left. The notch $d^2$ has no vertical wall, and is merely a centering notch, so that the shutter may be brought central by hand when circumstances may require it. As shown in Fig. 1, the tooth R of the detent E holds the shutter against the vertical wall of the notch $d'$, and the shutter cannot be moved from the right-hand position, where it is shown in full lines, over to the left-hand position without freeing the tooth R of the detent E from the notch $d'$. Now to accomplish this result the thumb-piece D is moved over toward the right-hand side, when the right-hand end of the tripping cross-piece $l$ will strike the tripping-lever C, which will be forced downward, and by the end of the screw F will act on the left-hand end of the detent E, and pressing down that end of the detent will raise the tooth R from the notch $d'$, when the shutter will move over. After the shutter has been moved across the lens the opposite movement of the thumb-piece D will cause the opposite end of the tripping cross-piece $l$ to depress the tripping-lever C, and after a sufficient movement the tooth R of the detent E will be lifted from the notch $d$, which will then be engaged by the detent, and the shutter may be moved from the left-hand side to the right-hand side of the apparatus. That part of the periphery of the shutter extending from the notches $d$ $d'$ to the end of the shutter may be cut away so as to be level with the bottom of the tooth R; but it is preferably disposed as in the drawings at $f\,f'$, Fig. 1, where it is shown as being formed of the segment of a circle not concentric with the periphery of the shutter.

It is desirable to have the shutter under control to vary the rapidity of its movements, which I accomplish in the following way: The flat spring N, which is attached to the link H at the one end and to the thumb-piece D at the other end, can be bent or bowed. If the shutter movement is resisted and the movement of the operator's finger is continued, the greater the bend of the spring will be and the more rapid will be the movement of the shutter when the same is freed from the detent-tooth R. To control this the thumb-screw F, which is in reality a regulating-screw for controlling the speed of the shutter, is used. It is evident that if the screw is raised the thumb-piece D will have to be moved a greater distance before either of the corners of the tripping cross-piece $l$ will strike the lever C, and vice versa. If the screw is screwed down, the corners of the tripping cross-piece $l$ will come in contact sooner with the tripping-lever C, and in this way the speed of the shutter may be regulated. By raising the screw F the thumb-piece D has to be moved through a considerable distance before the tooth R of the detent E is lifted from the notch $d$ or $d'$, whichever it may occupy, and the spring will be bent to a correspondingly-greater extent and the movement of the shutter will be more rapid. If, on the other hand, the screw F be screwed downward, the tripping-lever C will be held at a more elevated position and the corner of the tripping cross-piece $l$ will strike it sooner, and thus free the shutter from the detent-tooth R before the spring has become bent to as great an extent as would be the case were the tripping-lever C at a greater distance from the tripping cross-piece $l$. The screw F therefore regulates and controls the relation of the top of the tripping-lever C with reference to the bottom of the tripping cross-piece $l$ on the thumb-piece D. If the distance between these parts be greater, the spring must be bent or bowed to a greater extent before the detent is removed than it would be if the tripping-lever were closer to the bottom of the tripping cross-piece $l$. Thus by regulating the screw F the amount of energy given to the shutter is controlled and its speed is regulated, the amount of energy stored in the spring before the removal of the detent being regulated by the adjustment of this screw.

It will be seen that in this camera an exposure may be made by moving the shutter from the position shown in full lines to the position shown in dotted lines on the left, and that when in the latter position a push in the reverse direction on the thumb-piece D will make another exposure by moving the shutter from left to right. Thus the shutter, without regard to the position it occupies, is ready to be moved across the lens and make an exposure, the apparatus being at all times ready to be operated in one direction or the other and at like speeds without any moving of the shutter from side to side to compress the driving-spring, as is common in cameras in use at the present time.

The storing of energy in the spring N and the movement of the shutter when the detent is removed are accomplished by a push in one direction by the operator's finger, and is practically one operation, while in the cameras in use to-day this is accomplished only by two operations: first, setting the spring and the shutter, and, second, freeing the spring, so that the said spring may drive the shutter across the lens-opening, and these operations are usually accomplished by separate mechanism. It will be seen that the present arrangement is much simpler, can be made more cheaply, and is more efficient, in that the shutter is always ready for instant operation and does not require to be previously set before the operator makes the exposure on his plate.

I will now describe the mechanism that I use to prevent the shutter from flying backward or rebounding, as it frequently does when taking views which require short exposure, and consequently a rapidly-moving shutter, and this portion of my invention can be utilized with any rapidly-moving shutter, as well as with the shutter here shown. I illustrate it with this mechanism, but do not limit myself to its use therewith alone. A bar J is shown pivoted at its center and set up from the face or front of the camera A on a small plate M, which plate should be a little thicker than the shutter B. This plate M is merely used as a convenience with the particular structure shown. At each end of the bar J, which I will call an "absorption-bar," as it absorbs the impact of the shutter, is a pin, (shown at K on one end and at L on the other end,) which pins project into the face of the camera-front A, which is pressed so that the bar J with its pins K L can vibrate on its center, as shown by dotted lines in Fig. 1. The pins K L are so arranged that the shutter can strike them. The bar J is held by a screw, which forms a center about which it can turn and also admits of a little friction being had on the bar. The shutter B, as shown in full lines, is now on the right-hand side of the camera-box, and its outer corner has hit the pin K. The end of the bar J carrying the pin K is now depressed, and the other end carrying the pin L is elevated. Suppose now the shutter to be operated, it moves rapidly across the camera front, exposing the lens to the plate when the hole $b$ is opposite the hole S. Before the shutter comes to rest on the left-hand side of the camera its corner will strike the pin L smartly, vibrating the bar J within its limit of motion, as shown, which absorbs the impact of the shutter, and moving the bar into the position shown by the dotted lines, setting the said bar in the proper position to absorb the impact of the shutter when the same is moved from left to right, the end of the bar carrying the pin K then being elevated and ready to absorb the impact of the shutter when the same strikes it on the return movement.

I believe myself to be the first to use a device to absorb the impact of the shutter, so that it may come to rest without rebounding, expending its energy at the end of its movement in moving a piece of metal, which will itself absorb the surplus energy of the shutter. It will be evident that this mechanism could be arranged in many ways and with different shutters. If used with shutters of comparatively great weight moving with comparatively great velocity, the bar should be heavier and the friction on its pivot should be greater. It will be seen that the corners of the shutter are cut off at an angle, so that they may meet the pins L and K at an angle and travel slightly thereon as the shutter comes to rest. I consider this the best arrangement, but not at all as an essential element of my invention.

The shape of the thumb-piece D may be varied to suit the camera in which it is to be used, and likewise the shapes of the tripping-lever C and the detent-lever E may be varied at pleasure, and likewise the screw F can be differently arranged and the same result be reached.

I have shown a pin T above the detent-lever E. The same may be used, if desired; but the top circular edge of the shutter, on which rides the detent-tooth R, will serve, generally, as a stop to keep the detent-lever E in position without the use of the pin T.

Various devices can be arranged to take the place of the thumb-screw F to vary the relative positions of the tripping-lever C and the tripping cross-piece $l$. For example, thumb-screws could be placed at each end of the tripping cross-piece $l$, and by their movement the speed could be regulated; but such an arrangement is not as good as the one shown, as both screws would have to be adjusted to a like extent in order to secure a like rapidity of movement in both directions, while by the use of the screw F one adjustment serves to regulate the movement of the shutter in either direction.

An inferior modification of my invention might be made as follows: By omitting the notch $d$ the shutter could be made to act by the force of the spring when bent or bowed only in one direction—to wit, from right to left. In this modification the shutter would have to be returned to the position shown in Fig. 1 by full lines every time an exposure was made, unless the operator trusted to his own skill to get the necessary rapidity of movement. In this modification only one end of the tripping cross-piece *l* would be necessary, as without the notch *d* the shutter could be returned after use to the position shown without operating the tripping-lever C and detent E.

What I claim, and desire to secure by Letters Patent, is—

1. In a photographic-camera shutter, the combination of the shutter, a spring adapted to be energized to operate the shutter, a detent holding the shutter against the tension of the spring, and means between the spring and detent for placing the spring under tension and freeing the detent, substantially as described.

2. In a photographic-camera shutter, a shutter, a spring adapted to be energized to operate the shutter, a detent holding the shutter against the tension of the spring, and means between the spring and detent for placing the spring under tension and freeing the detent, combined with means for adjusting the tension of the spring to alter the speed of movement of the shutter, substantially as described.

3. In a photographic camera, the combination of the shutter, a spring adapted to be energized to operate the shutter, means for adjusting the tension of the spring to alter the speed of movement of the shutter, a detent holding the shutter against the tension of the spring, devices whereby with a continuous motion of the same instrumentality the spring is energized, the detent freed, and the shutter operated, and a device for absorbing the impact of the operated shutter, substantially as described.

4. In a photographic camera, the combination of a pivoted shutter having an opening therein, a spring adapted to drive the shutter in either direction, attached at its upper end to a pivoted thumb-piece and at its bottom to the shutter, a tripping-lever pivoted between the shutter and thumb-piece, and a detent located between the shutter and tripping-lever, the thumb-piece being adapted to vibrate the tripping-lever, free the detent, bend the spring, and operate the shutter, substantially as described.

5. In a photographic camera, the combination of a shutter provided with an opening, a link connecting the said shutter with a flat spring, a pivoted thumb-piece to which the spring is rigidly attached, a detent operated in connection with notches in the edge of the shutter, and adjustable devices for freeing the detent, located between the thumb-piece and detent and operated by the thumb-piece, substantially as described.

6. In a photographic camera, the combination of a pivoted shutter provided with an opening, a link, a flat spring attached rigidly to a pivoted thumb-piece, a detent operating in connection with notches in the shutter, and means for simultaneously regulating the amount of movement of the thumb-piece and the amount of energy given to the spring before freeing the detent from the notch in the shutter, substantially as described.

7. In a photographic-camera shutter, the combination of a pivoted shutter adapted to be vibrated in either direction to expose a plate, a flat spring to drive the same, a thumb-piece for bending the spring, a detent-notch at each end of the shutter to resist the movement of the shutter in either direction, a detent for engagement with the said notches, and a tripping-lever between the thumb-piece and detent and in operative contact with both, substantially as described.

8. In a photographic-camera shutter, the combination of a shutter, a spring to drive the same, a pivoted detent, notches in the edges of the shutter, a thumb-piece for moving the spring, a tripping-lever between the detent and thumb-piece and in operative contact with both, and means for adjusting the relation of the tripping-lever to the thumb-piece, substantially as described.

9. In a photographic camera, the combination of a pivoted shutter, a flat spring, a link connecting the same, a thumb-piece to drive the same, a detent operating in connection with notches in the edge of the shutter, a tripping-lever, and a tripping cross-piece arranged to operate the tripping-lever and through it the detent, substantially as described.

10. In a photographic camera, the combination of a pivoted shutter, a flat spring connected with the shutter by a link, a pivoted thumb-piece to which the spring is rigidly fastened, and a tripping cross-piece adapted to operate on the tripping-lever to move the detent, substantially as described.

11. In a photographic camera, the combination of a shutter, a detent, a tripping-lever, a thumb-piece, and a screw to regulate the relation between the tripping-lever and the tripping cross-piece which operates the same, substantially as described.

12. In a photographic camera, the combination of a pivoted shutter adapted to be vibrated in either direction to expose a plate, a flat spring to drive the same, a thumb-piece for bending the spring, a detent-notch at each end of the shutter, adapted to resist movement of the same in either direction, a detent for engagement with the said notches, a tripping-lever, and a device for regulating the amount of bend to the shutter-propelling spring connecting the detent and tripping-lever, the bending of the spring acting to move the tripping-lever and detent and free the shutter, substantially as described.

13. In a photographic-camera shutter, the combination of a shutter, a spring to move the shutter, a pivoted thumb-piece, the said spring being secured at one end to the thumb-piece and at the other to the shutter, a detent adapted to be moved to operate the thumb-piece, a tripping-lever between the detent and thumb-piece, and means for regulating the amount of energy to be given the spring, substantially as described.

14. In a photographic camera, a shutter, a flat spring connected therewith, and a thumb-piece for operating the same, in combination with a detent which holds the shutter while the spring is being bent, and means for regulating the amount of bend to be given to the spring, the freeing of the detent being accomplished by the same means that bends the spring, substantially as described.

15. In a photographic camera, the combination of a shutter, a detent to hold the same, and a tripping-lever, a pivoted thumb-piece with a spring connecting the shutter and adapted to bend the spring and trip the detent, substantially as described.

16. In a photographic camera, the combination of a spring-operated shutter and an absorption-bar which is moved by the shutter at the end of its stroke and absorbs the impact of the same, substantially as described.

17. In a photographic camera, the combination of a pivoted shutter adapted to operate in either direction, an absorption-bar pivoted at its center and adapted to receive and absorb the impact of the shutter whether the same moves from right to left or from left to right, substantially as described.

18. In a photographic camera, the combination of an absorption-bar pivoted at the center and provided with two pins adapted to co-operate with and to receive the impact of the shutter, the impact received in one direction setting the bar so that it can absorb the impact received in the reverse movement of the shutter, substantially as described.

19. In a photographic camera, the combination of an impact-bar and a movable shutter, said bar being moved by the shutter and absorbing the impact thereof, substantially as described.

20. In a photographic-camera shutter, the combination of an impact-bar and a movable shutter, said bar being moved by the shutter and absorbing the impact thereof, and means for limiting the vibration of said impact-bar, substantially as described.

Signed at the city, county, and State of New York this 28th day of October, 1890.

ABNER G. TISDELL.

Witnesses:
M. E. STODDARD,
H. F. DURBUR.